(12) United States Patent
Bamrah et al.

(10) Patent No.: US 7,706,817 B2
(45) Date of Patent: Apr. 27, 2010

(54) PROVISION OF GROUP SERVICES IN A TELECOMMUNICATIONS NETWORK

(75) Inventors: Baljit S. Bamrah, London (GB); Michael Beeston, Tiverton (GB); Ben Suffolk, Bristol (GB); William Dowie, Wellingborough (GB); Giles Knibb, Bristol (GB)

(73) Assignee: Orange Personal Communication Services Limited, Britsol (GB)

( * ) Notice: Subject to any disclaimer, the term of this patent is extended or adjusted under 35 U.S.C. 154(b) by 349 days.

(21) Appl. No.: 11/153,216

(22) Filed: Jun. 15, 2005

(65) Prior Publication Data
US 2006/0067502 A1    Mar. 30, 2006

(51) Int. Cl.
H04W 4/00    (2009.01)
H04M 3/42    (2006.01)

(52) U.S. Cl. .................................. 455/466; 455/414.1

(58) Field of Classification Search .................. 370/259, 370/260; 379/201.01, 202.01; 455/414.1–414.4, 455/412.1–412.2, 466
See application file for complete search history.

(56) References Cited

U.S. PATENT DOCUMENTS

| | | | | |
|---|---|---|---|---|
| 5,481,254 A | * | 1/1996 | Gaskill et al. | 340/825.52 |
| 5,684,862 A | * | 11/1997 | Finnigan | 379/88.22 |
| 5,923,733 A | * | 7/1999 | Binns et al. | 379/88.23 |
| 6,018,668 A | | 1/2000 | Schmidt | 455/518 |
| 7,013,157 B1 | * | 3/2006 | Norman et al. | 455/503 |
| 2002/0072354 A1 | | 6/2002 | Kundaje et al. | 455/416 |
| 2002/0141560 A1 | * | 10/2002 | Khayatan et al. | 379/219 |
| 2002/0173319 A1 | | 11/2002 | Fostick | 455/466 |
| 2004/0005040 A1 | | 1/2004 | Owens et al. | 379/93.24 |
| 2005/0078612 A1 | * | 4/2005 | Lang | 370/260 |
| 2005/0170856 A1 | * | 8/2005 | Keyani et al. | 455/466 |
| 2005/0250520 A1 | * | 11/2005 | Johnson et al. | 455/466 |
| 2007/0117634 A1 | * | 5/2007 | Hamilton et al. | 463/42 |

FOREIGN PATENT DOCUMENTS

| | | |
|---|---|---|
| GB | 2327571 A | 1/1999 |
| GB | 2380902 A | 4/2003 |
| WO | WO 98/10608 | 3/1998 |
| WO | WO 01/47224 A1 | 6/2001 |
| WO | WO 02/17653 A2 | 2/2002 |
| WO | WO 02/060199 A1 | 8/2002 |
| WO | WO 2004/008335 A1 | 1/2004 |
| WO | WO 2004/008716 A2 | 1/2004 |

* cited by examiner

*Primary Examiner*—Lester Kincaid
*Assistant Examiner*—Nathan Mitchell
(74) *Attorney, Agent, or Firm*—Kevin P. Radigan, Esq.; Blanche E. Schiller, Esq.; Heslin Rothenberg Farley & Mesiti P.C.

(57) ABSTRACT

A method and system for providing group services in a telecommunications network. Groups of subscribers can be created and each group associated with its own telephone number. A member of a group can communicate with others in that group using a group service and the telephone number associated with the group. In one aspect, a number of different, and separately processed, group services are provided which can be accessed using a common group telephone dialing number.

20 Claims, 18 Drawing Sheets

Group Number Store

| Group Name | Group Number | Subscriber Member Username | Individual Subscriber Number | F1 |
|---|---|---|---|---|
| BCC 34a | 44 772 4444 2345 33a | SAMMY 31a | 44 772 323 3454 35a | |
| | | COACH 31b | 44 773 767 2334 35b | |
| | | JIM 31c | 44 767 876 897 35c | X |
| | | JOHN 31d | 44 432 898 837 35d | |
| Elvis Fan Club 34b | 44 772 4444 3216 33b | JANE 31e | 44 871 454 273 35e | X |
| | | SARAH 31f | 44 989 474 374 35f | X |
| | | SAMMY 31a | 44 772 323 3454 35a | |
| | | HARRY 31b | 44 773 767 2334 35b | |
| | | | | |
| | | | | |

PROVISION OF GROUP SERVICES IN A TELECOMMUNICATIONS NETWORK

CROSS-REFERENCE TO RELATED APPLICATION

This application claims priority to Great Britain Application No. GB 0413349.2, filed Jun. 15, 2004, the entirety of which is hereby incorporated herein by reference in its entirety.

TECHNICAL FIELD

The present invention relates to communication in a telecommunications network. More particularly, it relates to the provision of group services in a telecommunications network.

BACKGROUND OF THE INVENTION

The development of telecommunications technology has provided people with more means by which to communicate with others. In addition to standard person-to-person voice calls, people can now use other means of communication such as text messaging, multimedia messaging, voice mail, conference calling and the like.

However, despite the advances made in telecommunications technology, on the whole communications still tend to be used for one-on-one communication. The lack of convenient ways in which to utilize existing technology for group communication has prevented its wide scale use in this manner.

WO 02/17653 describes a mobile communication system and method for broadcasting emails and voice mails to registered groups. The sender's address can be replaced with the destination group's address upon broadcast, to enable a reply to go to all group members.

WO 98/10608 describes a mobile station for a communications network, which stores groups of directory numbers in a memory. The mobile user can prepare a message and select a desired group. The mobile station then sends the message to each of the directory numbers appearing in the selected group.

WO 2004/008335 describes an invention for providing chat group services to mobile terminals that permits integrated voice and text messaging. Each participating mobile terminal runs a chat application, and a server connected to the wireless network runs applications and components for supporting the chat group services on the mobile terminals.

U.S. 2004/0005040 describes a system for integrating electronic mail, voice mail and fax mail in a universal mailbox. Message receivers may access their messages with a telephone or computer irrespective of the communication medium used by the sender.

Group voice dispatch services, also known as "Push to Talk" (PTT), are known, for example the Nextel iDen™ system. These systems allow groups to be defined, for which group communications services such as half-duplex voice calls, are provided. However, these systems require specially adapted handsets, which may be specific to a particular type of network, and therefore wide adoption of the technology, particularly for users of other types of mobile communications networks, has yet occurred.

Whilst various types of group communication in telecommunications systems are known, prior systems have not been particularly convenient to use, and therefore many users have been prevented or discouraged from adopting the technology.

SUMMARY OF THE INVENTION

In accordance with one aspect of the present invention, there is provided a method for providing group services to subscribers in a telecommunications network, including:
receiving a first service request in a first communications mode, said first service request including said first telephone dialing number,
routing said first service request to a first destination selected on the basis of said first telephone dialing number,
in response to receipt of said first service request at said first destination, selecting said first group of participants on the basis of said first telephone dialing number;
in response to selection of the first group, providing a first group service to the selected first group of participants;
receiving a second service request in a second communications mode, which communications mode is different to said first communications mode, said second service request including the first telephone dialing number;
routing said second service request to a second destination selected on the basis of said first telephone dialing number;
in response to receipt of said second service request at said second destination, selecting a second group of participants on the basis of said first telephone dialing number; and
in response to selection of the second group, providing a second group service to the selected second group of participants.

In accordance with this aspect of the invention, a single telephone dialing number is not associated with a single communication end-point, as in the prior art. Rather, a single telephone dialing number is used, firstly, to route first and second service requests to a respective different group service endpoint and, secondly, to identify a group of participants, which may each have an individual telephone dialing number, in each different group node. The group services can then be completed by the group service using the individual telephone dialing numbers of each participant. By provisioning the same telephone dialing number to identify a group across a plurality of services, which each use a different communications mode (such as voice calling, text messaging, multimedia messaging, and voice mail, etc.), a particularly useful and convenient heterogeneous set of group communications modes is enabled whereby a sophisticated set of group communications services can be provided.

The use of a single telephone dialing number to identify the group in different services has a particularly significant effect, namely in simplifying the process of using the group service. As noted above, group services have in the past been relatively complex and/or require special equipment set ups. In the present invention, the number used to identify the group can be stored in a normal telephone contacts directory (which normally contain single-person or single-organisation telephone details) of a subscriber's telephone handset, along with a group name identifying the group. To initiate any of the group services which are available, the subscriber can simply look up the group number in their contacts directory, and send a service request to the group number stored in their contacts directory. Since each service uses the same group number to identify the group members, no further identification of the group is required.

For example, sending a text message to subscribers of a group can be achieved simply by sending a message to the telephone number associated with that group. The network service apparatus then retrieves contact details for some or all of the members of the group associated with that number, and sends the text message to some or all of the members using their respective contact details.

Likewise, similar functionality can be used for other group services, such as voice mail, conference calling, multimedia messaging, etc. Using a single telephone dialing number provides a simple and convenient mechanism by which to utilize these group services.

Preferably, details associating subscribers with respective groups, and associating those groups with respective telephone numbers, are stored in a common area accessible by a number of different group services modules. Each group can be created and maintained in that common area by using the telephone dialing number associated with that group.

Preferably, the method includes: receiving an administration request, said administration request including said first telephone dialing number; routing said administration request to a destination selected on the basis of said first telephone dialing number and a group administration command; and in response to receipt of said administration request, selecting group member data relating to said first group of participants and updating said selected group member data.

In this way, the administration of the group may also be carried out using the single telephone dialing number allocated to a group.

In accordance with a further aspect of the invention there is provided a method for providing a group service to subscribers in a telecommunications network, including: storing data indicating a set of telephone dialing numbers which are intended to be allocated for use in the provision of group services; conducting a group set up procedure for defining a service group, said set up procedure including: a) receiving a group set up request; b) allocating a first telephone dialing number from said set of numbers to said group; c) storing group member data identifying a plurality of members of said group; and d) identifying said first telephone dialing number to one or more of said plurality of members of said group.

This aspect of the invention provides a method whereby group numbers can be allocated in a systematic way during the set up of groups which will subsequently have access to the group service.

According to a yet further aspect of the invention, there is provided a method for providing a group service to subscribers in a telecommunications network using a group messaging system, including: at said group messaging system, receiving a request message from a message sender, the request message including a calling line identity for the message sender; in response to receiving the request message, copying said request message to form group messages, and transmitting said group messages to a plurality of members of the selected group of recipients, the group messages including a calling line identity whereby messages are routed to said group messaging system.

By replacing the calling line identity of the message sender with that of the group messaging system, any reply message which the recipients send to the message will automatically be routed to the group messaging system, rather than to the message sender. Hence, the reply messages can also be distributed to all relevant members of the group, thus implementing a reliable group messaging system.

Further, if the recipients have a telephone dialing number entered in their contacts directory which corresponds with that of the calling line identity included in the group messages, the recipients can readily determine that the message, when received, is a group message, rather than a message sent one-to-one from the message sender.

BRIEF DESCRIPTION OF THE DRAWINGS

Further features and advantages of the invention will become apparent from the following description of preferred embodiments of the invention, given by way of example only, which is made with reference to the accompanying drawings, wherein:

FIG. 3 shows an example record in the group number store;

BEST MODE FOR CARRYING OUT THE INVENTION

Figure 1:
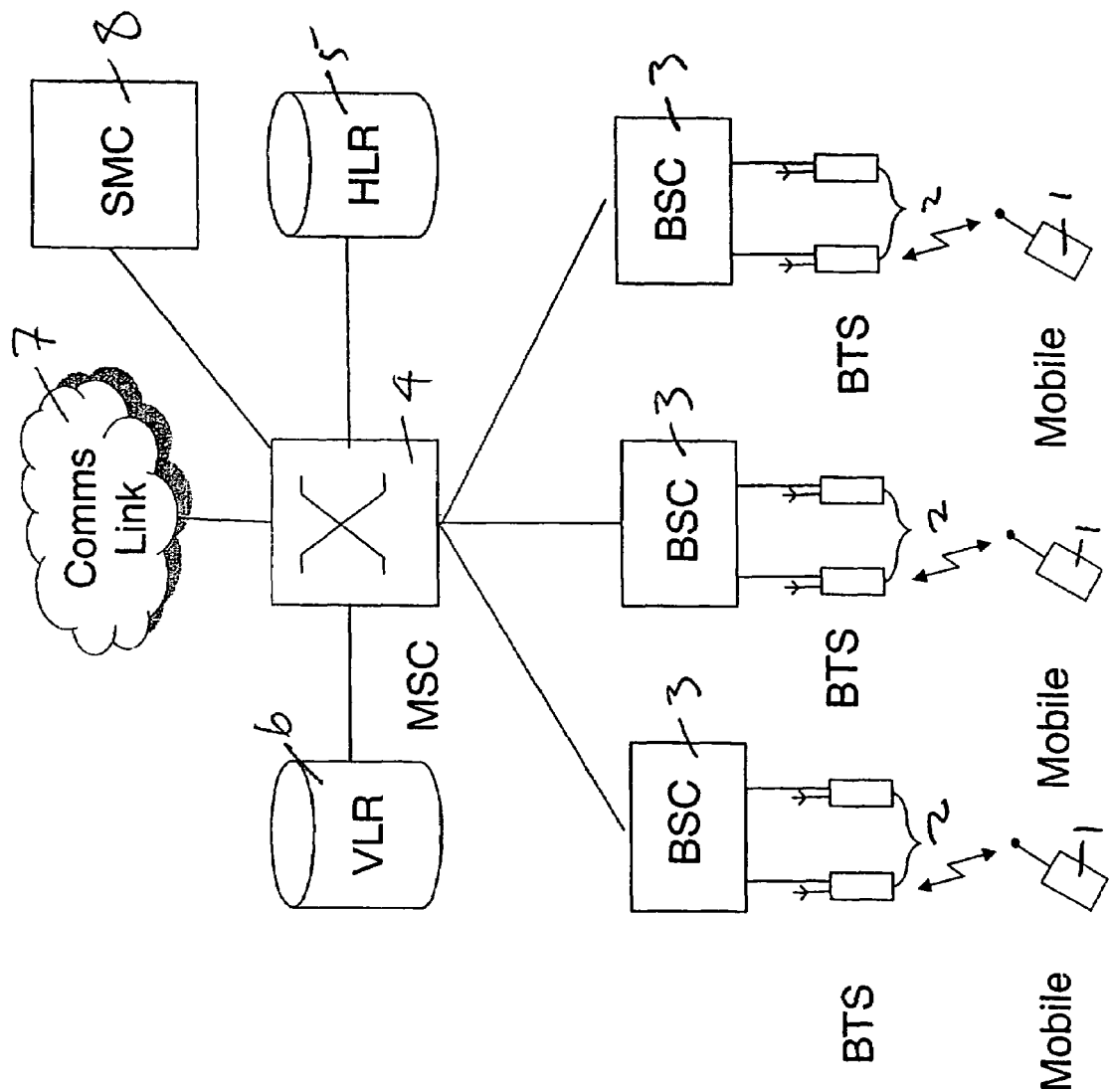
FIG. 1 shows a block diagram of a mobile telecommunications network.

FIG. 1 shows a public land mobile network (PLMN) in schematic form. A mobile switching centre (MSC) 4 is connected via communication links to a number of base station controllers (BSCs) 3. The BSCs 3 are dispersed geographically across areas served by the MSC 4. Each BSC 3 controls one or more base transceiver stations (BTSs) 2 located remote from, and connected by further communication links to, BSC 3. Each BTS 2 transmits radio signals to, and receives radio signals from, mobile stations 1 which are in an area served by that BTS 2. That area is referred to as a "cell". A PCN network is provided with a large number of such cells, which are ideally contiguous to provide continuous over the network territory.

A MSC 2 is also connected via communications links 7 to other MSCs (not illustrated) in the remainder of the mobile communications network, and to other networks such as a public service telephone network (PSTN), which is not illustrated. The MSC 4 is provided with a home location register (HLR) 5, which is a database storing subscriber authentication data including the international mobile subscriber identity (IMSI) unique to each mobile station 1.

The MSC 4 is also provided with a visitor location register (VLR) 6 which is a database temporarily storing subscriber authentication data for mobile stations active in its area. The MSC 4 is also connected to a short message centre (SMC) 8 to/from which it sends and receives SMS messages.

The mobile network supports voice calls between mobile stations 1 registered with the network, or between mobile terminals and landline phones. For example, using a mobile station 1, a subscriber can make a call to another mobile station. The subscriber dials the destination telephone dialing number, and the initiating mobile sends a call initiation request to the nearest BTS 2. The BTS forwards the request and telephone number to the local MSC 4 via the BSC 3. The MSC 4 validates the request and checks, using the destination telephone number, in the HLR 5 to find where the destination mobile station is located. The MSC 4 connects itself to the BSC serving the destination terminal and sends a connection request. The destination BSC receives the request and sends a broadcast to all BTSs to which it is connected. The destination mobile station acknowledges the request. The voice call is then connected to the destination mobile station.

The mobile network also supports store and forward messaging, which can provide text and/or multimedia messaging. This is where a message, such as a text or multimedia message, is created and sent to a destination address identified by a telephone dialing number. SMS (a type of text messaging) and MMS (a type of multimedia messaging) are two examples of store and forward messaging. It should be noted that throughout the specification the terms text messaging and multimedia messaging will be used to refer to different types of store and forward messaging. Multimedia messaging is a type of messaging where messages with multimedia content, including text, sound and images, can be sent.

A user initiates messaging (e.g. an SMS) by entering the message into the phone 1 and sending it to the destination telephone dialing number. The SMS is sent to the MSC 4 via the BTS 2 and BSC 3, which in turn sends the SMS to the SMC 8. The SMC interrogates the HLR 5 to find the location of the destination mobile station, and forwards the SMS onto the MSC of the BTS serving the destination mobile station. The destination MSC forwards the SMS onto the destination mobile station via the BTS.

A telephone dialing number is a number used for, inter alia, setting up circuit switched voice calls. The number is a set of digits that are dialled to set up a voice call. An example of a telephone dialing number is one that complies with the Mobile Subscriber ISDN (MSISDN). The number has a country code comprising up to 3 digits, a national destination code, of 2 to 3 digits, and a subscriber number, comprising up to 10 digits. A typical MSISDN is +44 772 2334 3345, where 44 is the country code, 772 is the national destination code, and 2334 3345 is the subscriber number. Optionally, if dialing nationally within the same country, the country code may be omitted, providing a '0' is added before the national destination code.

Figure 2A:
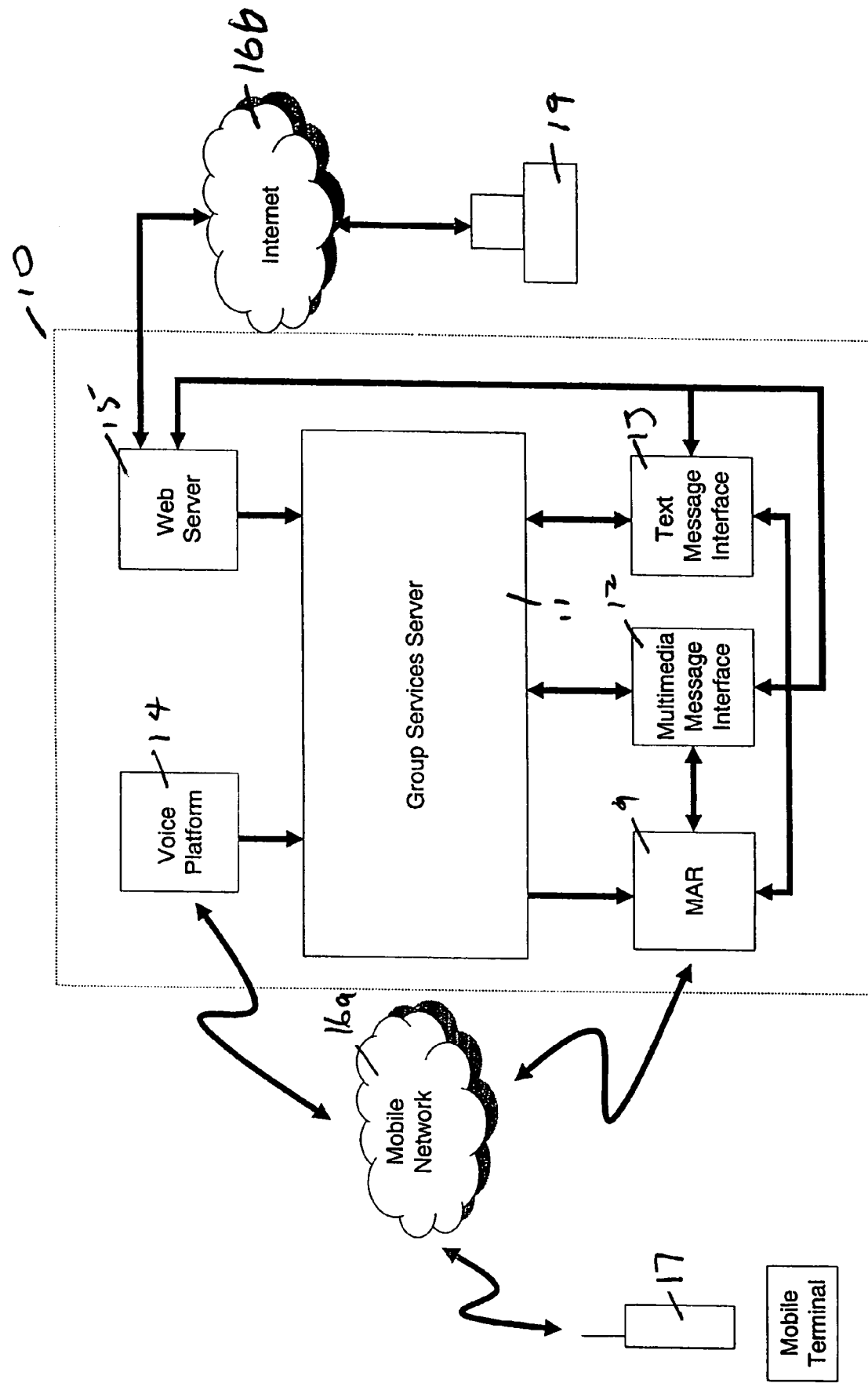
FIG. 2a shows a block diagram of a preferred embodiment of the invention including a network service apparatus with a server, voice platform, web server and text interface.

FIG. 2a shows a network service apparatus 10 for implementation in a telecommunications network according to a preferred embodiment of the invention. The apparatus 10 enables subscribers of the telecommunications network to communicate with groups of other subscribers by using group services. Each group service is invoked using a telephone dialing number associated with the group with which the subscriber wishes to communicate, referred to herein further as the "group number". A group service is a telecommunications service that provides the ability to communicate with a plurality of subscribers. A telecommunications service is a particular means or mode of telecommunication such as store and forward messaging, voice mail, conference calling and the like. Therefore, utilizing a group service involves sending some form of communication to a group of subscribers, or receiving some form of communication sent to a group subscriber by being a part of that group. A subscriber invokes a group service by sending a service request using the group number. For example, the service request may be a text message sent to the group number, or a voice call set up using the telephone dialing number.

The telecommunications network may comprise several interoperating networks of one or more types, such mobile networks, landline networks and computer networks. A subscriber can utilize the group services provided by the apparatus 10 using one of the telecommunications networks and appropriate terminal equipment. For example, they can access the services over a mobile network 16a using a mobile terminal 17, or over a computer network 16b using a computer 19. The different networks 16a, 16b might be operated by different service providers. In this specification, a subscriber or user is a customer who has subscribed to one or more service providers to use one or more of the networks 16a, 16b that provide access to the group service apparatus 10.

The group service apparatus 10 further enables users to set up and maintain groups of subscribers, to which communications are sent. The groups, for example, may be several people who share a common interest, or belong to the same sporting, social or community group. The apparatus 10 allows for an administrator that sets up groups, and controls admission of subscribers to a group. Once admitted, a subscriber is permitted to invoke or request group services in relation to that group, that is, send communications to the group for members to receive, and to receive any communications sent to the group. The apparatus 10 also allows group members to review a log of group communications.

The apparatus 10 comprises various group services modules including a voice platform 14, web server 15, text message interface 13 and a multimedia message interface 12 each of which communicates with a group services server 11. The text and multimedia modules provide one mode of communication while the voice platform provides another mode. A message application router (MAR) 9 routes incoming text and/or multimedia messages sent to a group number to the text 13 and multimedia 12 interfaces as required. The physical configuration of the modules 9, 11-15 is not important as they may be arranged in various ways. For example, the entire apparatus 10 may be a single piece of hardware, or alternatively, the modules may be implemented in two or more separate pieces of hardware. Further, where two or more separate pieces of hardware are used to implement the apparatus 10, each may reside in the same place or at two or more different physical locations. Where multiple pieces of hardware are used, they may communicate with each other in any suitable fashion, for example in a wired or wireless local or wide area network, or using a wired or wireless telecommunications network.

The server 11 assists the provision of communications received in the various telecommunications modes to groups of subscribers. The text 13 and multimedia 12 message interfaces, which receive and send messages, access the server 11 to find members of the group to which messages should be sent, to authorise users, to carry out administration tasks, to store and retrieve messages, and to update billing records. The voice platform 14, which handles voice mail and conference calling, accesses the server 11 to authorise users, to store and retrieve recorded messages, and to handle billing. The web server 15 provides an interface by which users can query message logs and carry out administration tasks. The web server also provides bulletin boards for groups and enables text and multimedia messages to be sent.

Figure 2B:
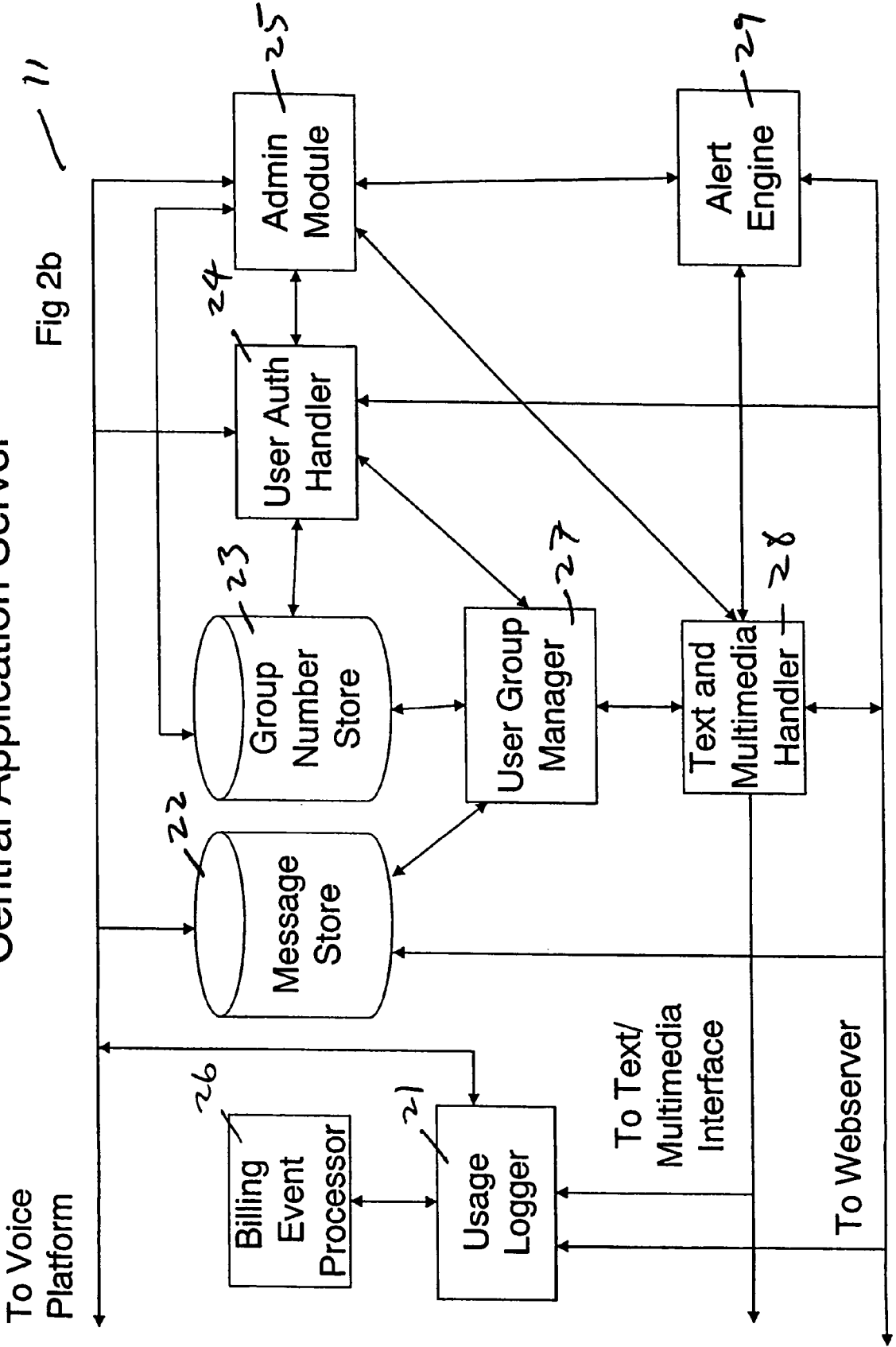
FIG. 2b shows a block diagram of the functional components implemented on the server of the network service apparatus.

FIG. 2b shows the group service server 11 in more detail. The server 11 includes a group number store 23 that contains details of the groups of subscribers. FIG. 3 shows an example of a simplified data record 36 providing one possible example of how subscribers 31a, 31b etc in a group 32a, 32b etc are associated with that group. For each group, e.g. 32a, the store 23 stores the telephone dialing number 33a of that group, the name of the group 34a, and appropriate details of all subscribers 31a-31d that are members of the group 32a, including their individual subscriber telephone dialing numbers 35a-35d (by which the network routes voice call, text messages, etc. to their individual handsets) and usernames 31a-31d. The individual subscriber telephone dialing numbers are referred to herein further as "individual subscriber numbers". As can be seen from the record 36, a subscriber (e.g. "SAMMY") can be a member of more than one group and may use different usernames for each group (e.g. "COACH" and "HARRY"). The record also includes one or more flags 37 for indicating various statuses of each member, such as whether a member has been blocked. It will be appreciated by those skilled in the art that the group records in the store could be structured in any suitable manner, of which FIG. 3 is one example.

Connected to the group store is a user group manager module 27 that queries the store 23 to obtain details of subscribers associated with a particular group. This information is then used to enable the system to provide a group communication to the members of the group the communication is intended for.

Also shown in FIG. 2b is a message store 22, which stores group communications that are handled by the apparatus 10. For example, text messages, multimedia messages, conference calls and voice mails are stored. An administration module 25 is provided that communicates with the web server 15, text message interface 13, multimedia message interface 12 and optionally voice platform 14 to facilitate the creation and maintenance of groups. When a request to use a group service or administration function occurs via web, text, multimedia or voice means, a user authorisation handler 24 checks that the subscriber has permission to do so. A usage logger 21 and billing event processor 26 track use of the apparatus 10 and create the appropriate billing information for use by the service provider. During group creation and maintenance, an alert engine 29 keeps those involved informed of what changes are proposed or taking place. A text message handler 28 which in operation receives texts from and sends texts to the text interface 13 communicates with the user group manager 27, user authorisation handler 24, administration module 25, usage logger 26 and alert engine 29.

The manner in which the various groups services are utilized by way of a single telephone dialing number which identifies the same group in each of these services will now be described with reference to a particular example and FIGS. 1 to 15b. The functionality will be described for each mode of telecommunication in turn.

Text Message Functionality

Figure 4:
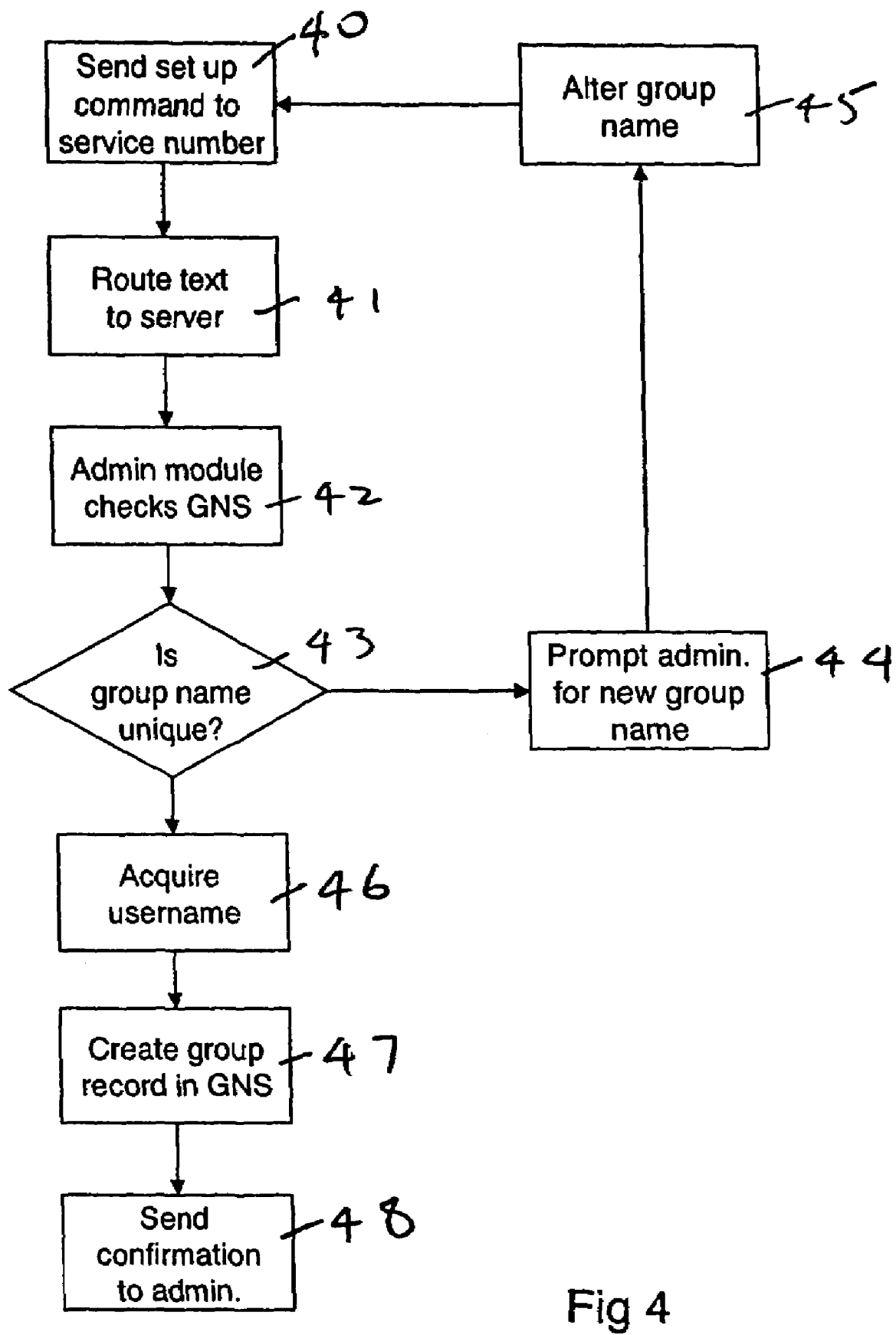
FIG. 4 shows a flow diagram of a group creation procedure using text messaging.

Referring to FIG. 4, a subscriber can create a new group using text messaging by sending 40 the appropriate set up command supported by the apparatus 10 to the group services server 11 using a service number. The text message preferably uses the SMS protocol. The service number in the form of a predetermined telephone dialing number (e.g. 0800 9999) will be any suitable telephone dialing number selected by the service provider and made available to users. For example, to create a new group, the subscriber (who then becomes the administrator of the group) may send 40 a message such as "SETUP Bruton Cricket Club" in a text message to the service number, where "SETUP" is the command to set up the group, and "Bruton Cricket Club" is the proposed name of the group. The MAR 9 routes 41 the message from the network to the destination of the text message interface 13, which then passes the request to the text handler 28 in the server 11. The handler 28 then passes the request on to the administration module 25 which processes it. Firstly, the administration module 25 checks 42 with the group number store that the group name does not already exist. If it does exist, an alert advising this fact is sent 44 using the alert engine 29 back to the administrator via the text handler 28 and text interface 13. The administrator must then create 45 a new group name, and resubmit 40 the text request to set up a group. In an alternative embodiment, identical group names may be permitted for different groups.

If, as shown in FIG. 4, the group name has not previously been registered (or if it has, but the system permits multiple identical group names), then the administration module 25 uses the alert engine 29 to send 46 an alert to the administrator to request a username. The administrator sends 48 a text to the service number, and the administration module 25 then checks it is valid, and responds via an alert to the administrator as confirmation. The administration module 25 then queries the group number store 23 to find the next available group number and creates 47 a new record e.g. 32a in the group number store 23 to associate the group name with the group telephone dialing number. At the initial stage, the record includes the group name, the newly allocated group number, and the details of the administrator, including their individual subscriber number and username. The group number is then activated in the network 16a, 16b.

An alert text message 48 is sent back to the administrator from the alert engine 29 indicating the group has been successfully created. The alert 48 will also indicate the allocated group number (e.g. +44 772 4444 2345) and any other information to assist the administrator to use the service. It should be noted that group number will be selected from a range of telephone dialing numbers that the service provide has access to for allocating to its subscribers. As such, the group number will appear to be a standard telephone dialing number and may be in the same format as telephone dialing numbers allocated to individual subscribers. However, certain blocks of numbers may be allocated for use as group numbers, in which case it may be possible for the network to recognize a group number from, for example, a standard prefix used in all such group numbers.

The group number can be used to transmit commands to and from the administration module which affect the administration of the associated group data.

Figure 5:
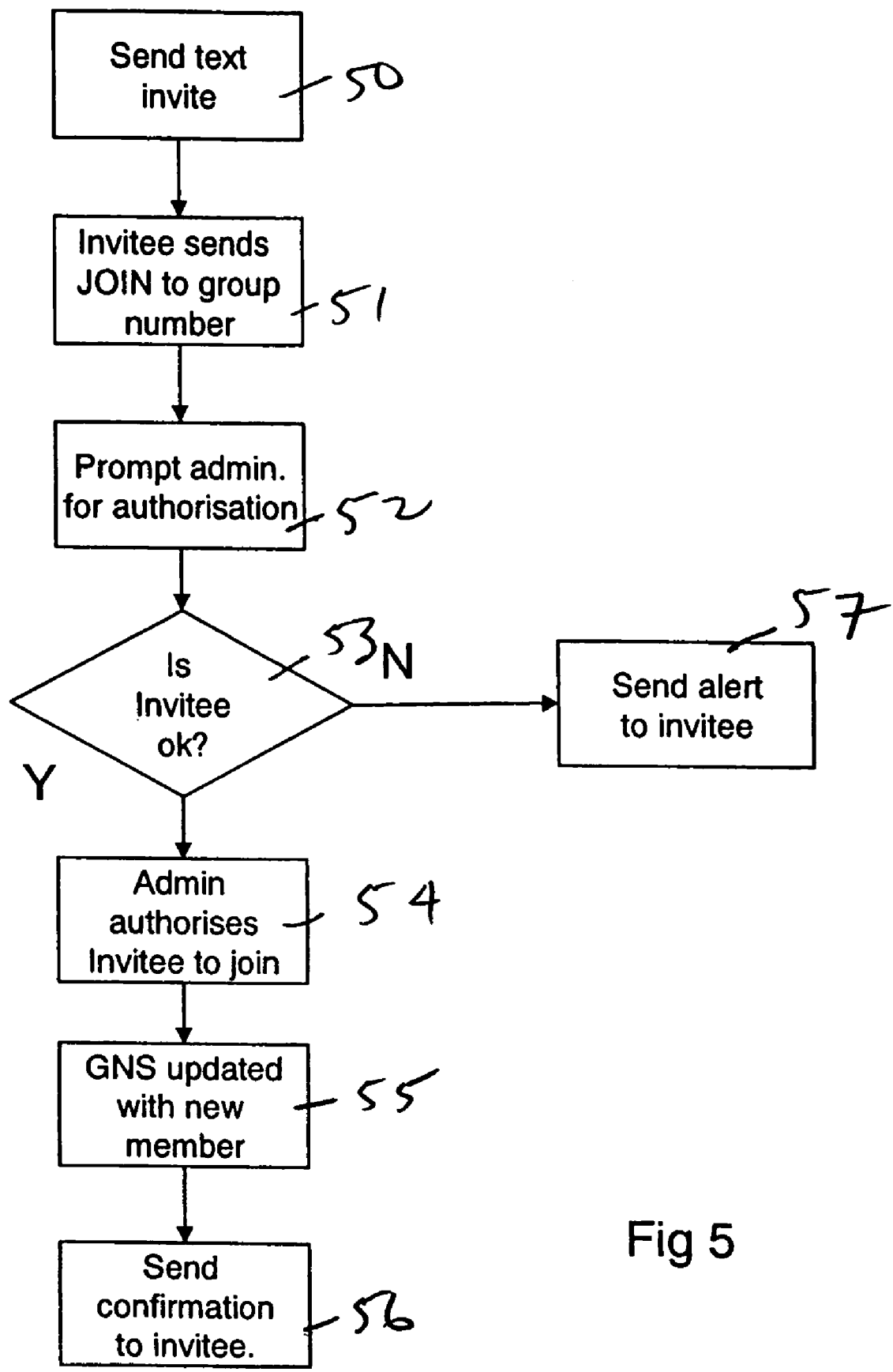
FIG. 5 shows a flow diagram of a text invite procedure.

FIG. 5 shows how the administrator (e.g. "COACH") sends out text invites to other subscribers he wishes to join the group, so that he can communicate with them on matters relating to the club. The administrator sends 50 a text message to the subscriber they wish to invite, including the command INVITE and the subscriber's individual telephone dialing number. The administration module 25 then generates an invite message, which is sent to the indicated individual subscriber number and with the relevant group number as the originating calling line identity (CLI). The invite text message includes an invite message and instructions that, should the invitee wish to join the group, they should text a command (e.g. "JOIN") along with their chosen username to the group number. Upon reading the message, the invitee can do nothing, in which case they are not registered with the group, or alternatively reply 51 with the command "JOIN" and their desired username (e.g. "SAMMY"). The reply message is sent automatically to the appropriate group number, since this was included as the CLI of the message received.

It should be noted that it is not necessary to send the invite by text message. Any suitable method could be used, such as email, a telephone call, multimedia message or even a face-to-face meeting. All that is necessary is that the invitee is made aware of the appropriate group number, and told to text the command "JOIN" to that number. The originator of the reply message, if sent, is identified by means of the CLI in the reply message, which includes the individual subscriber number of the invitee.

The reply message is routed to the administration module 25 in the server, which then generates a prompt for authorisation message 52 using the alert engine 29, and this is sent to the group's administrator via the text handler 28 and text interface 13, with the relevant group number as the originating CLI. The alert indicates to the administrator that the user (e.g. "SAMMY") wants to join the group and also indicates his individual subscriber telephone dialing number. The administrator is prompted to reply with a generated code inserted into the alert, if he wants to accept the user as a member. If the administrator does not want to accept the user, he ignores the message, and the user is not registered with the group. Alternatively, there may be a timeout, or alternatively a code word to reject the user, in which case the user is alerted 57 by the system that he has not been accepted. If the administrator wants to accept the user 53, he replies 54 to the text message with the code word and this reply is automatically routed back to the administration module 25. The administration mode 25 updates 55 the group number record in the group number store 23 to indicate that the user is now a member by including his details in the group member data record. The group number store 23 stores group member data relating the group members to the group name and the group number. The new member is then alerted 56, via the alert engine 29, with a text message having the group number as the originating CLI, that he is a member of the group, and is informed of any necessary information regarding membership. The new member can then proceed to store the group number in his normal telephone contacts directory. The administrator may also be sent a confirmatory alert.

It will be appreciated there are many other possible ways to conduct the join procedure, of which the above is one example. For instance, in another embodiment, sending the invite by text may be considered as authorisation, and therefore the invitee is automatically registered once they text the word "JOIN". Alternatively, the join procedure may be initiated by the subscriber who wishes to join. Alternatively, a group administration application may be provided on a telephone handset whereby a person can be added to the group by choosing the desired group and entering them as a new member. The application will then communicate with the server 11 to set up the new group member automatically, without further input from the administrator.

Figure 6:
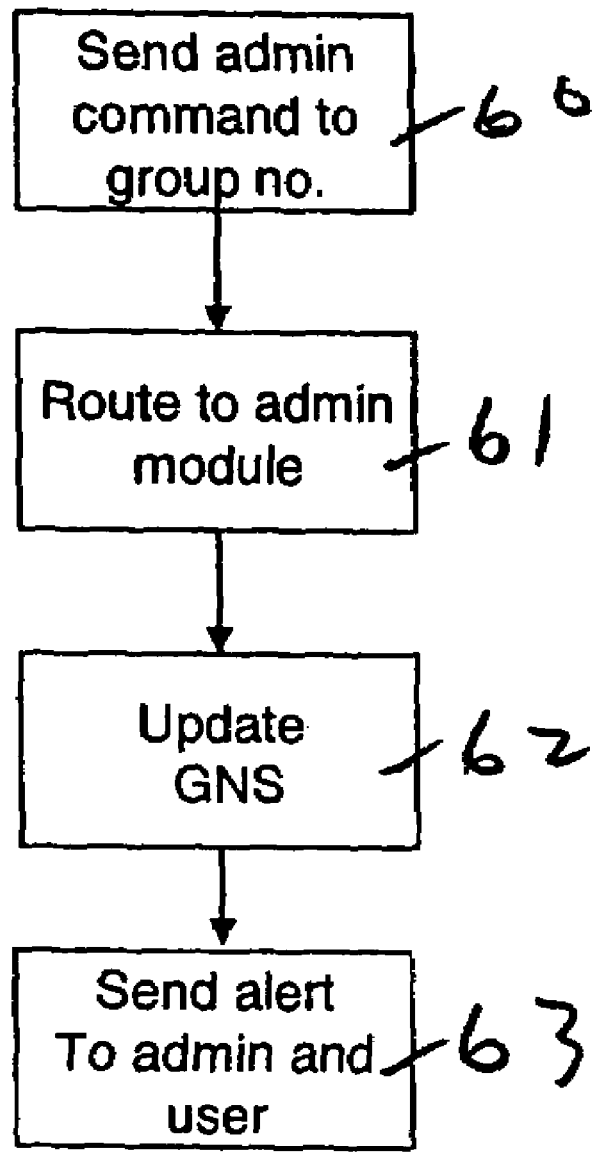
FIG. 6 shows a flow diagram of an administration procedure using text messaging.

As shown in FIG. 3, each group member has one or more statuses 37 that may be specified and stored in the group number store 23. For example, a member may be the group administrator, or may be blocked or suspended by the administrator to prevent them receiving or sending messages to the group, or participating in conference calls or accessing or leaving voice mails while the block is in place. A member may block themselves temporarily, for example if they are going away for a few weeks. Referring to FIG. 6, the administrator can suspend or block a member by sending 60 the correct administration command (e.g. "BLOCK") with the username (e.g. "JIM"), or individual subscriber telephone dialing number, of the member in a text message to the group number. This is routed 61 to the administration module 25 which checks permissions with the group number store 23 and, if the administrator is authorised, updates 62 a status flag in the group number store 23 (as shown in FIG. 3) to show the member is blocked. An alert is sent 63 to the user and/or administrator confirming the action taken. Similarly, a group member may block themselves, using this procedure and suitable commands (e.g. "ON" or "OFF").

An administrator may follow the same procedure shown in FIG. 6 for removing someone entirely from the group. By sending 60 a command (e.g. "REMOVE") with a username to the group number, and if the correct permissions exist, the administration module 25 will delete 62 the username specified in the text from the group record in the store 23. Alerts are sent 63 as appropriate. Similarly, a member may remove themselves, by texting 66 a command (e.g. "LEAVE") to the group number. Other different maintenance procedures may also be implemented in the system, where desirable. For example, group names and usernames can be changed, as well as administrators. This can be done in a similar manner, by sending an appropriate command (e.g. "CHANGE") along with the username/group name and the new username/group name. Changing the administrator will use a slightly different procedure, whereby it is clear that the change is not a name change, but rather an change swap, so that the appropriate permissions are changed.

Figure 7A:
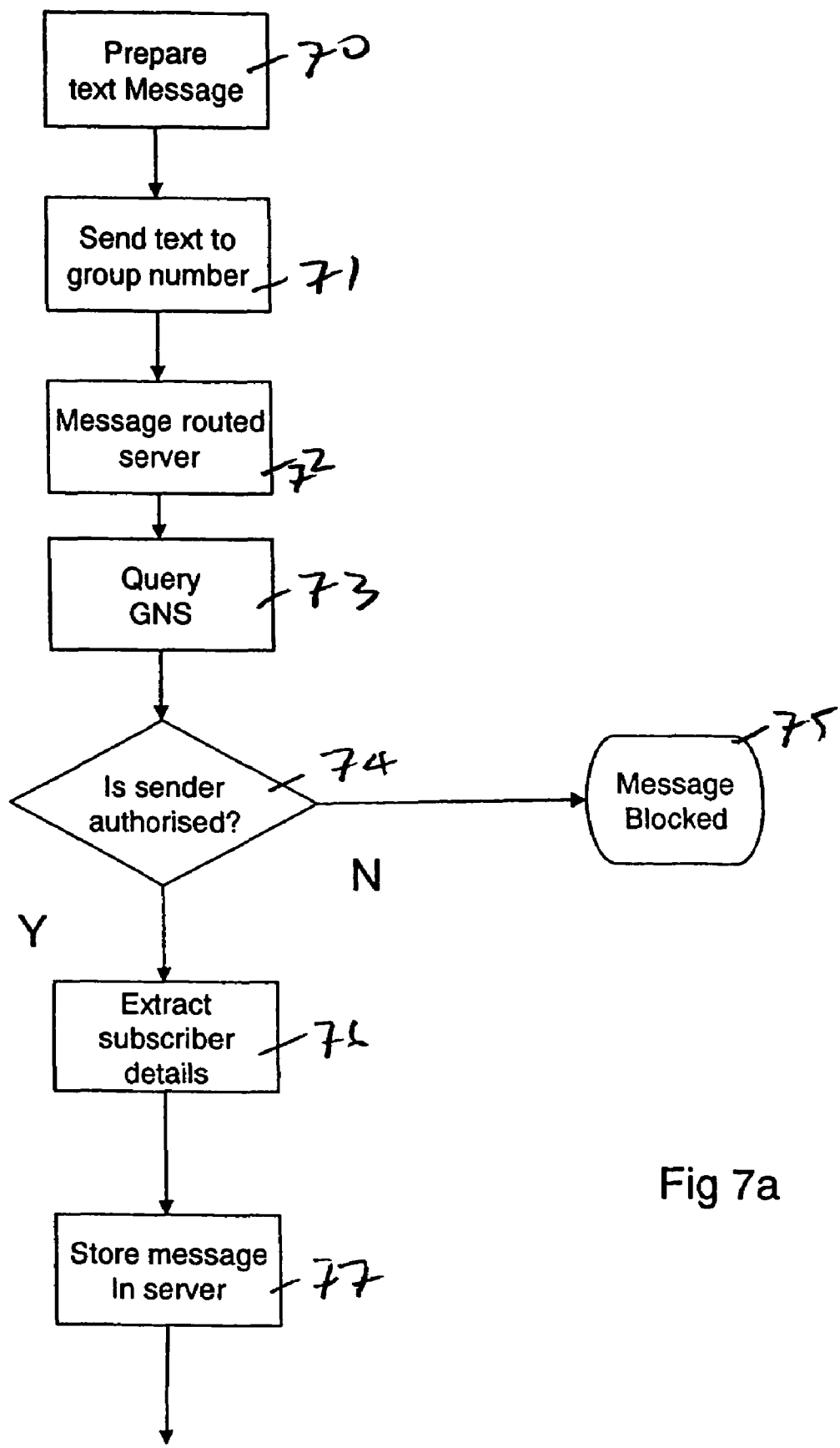
FIGS. 7a and 7b show a text broadcast procedure.
Figure 7B:
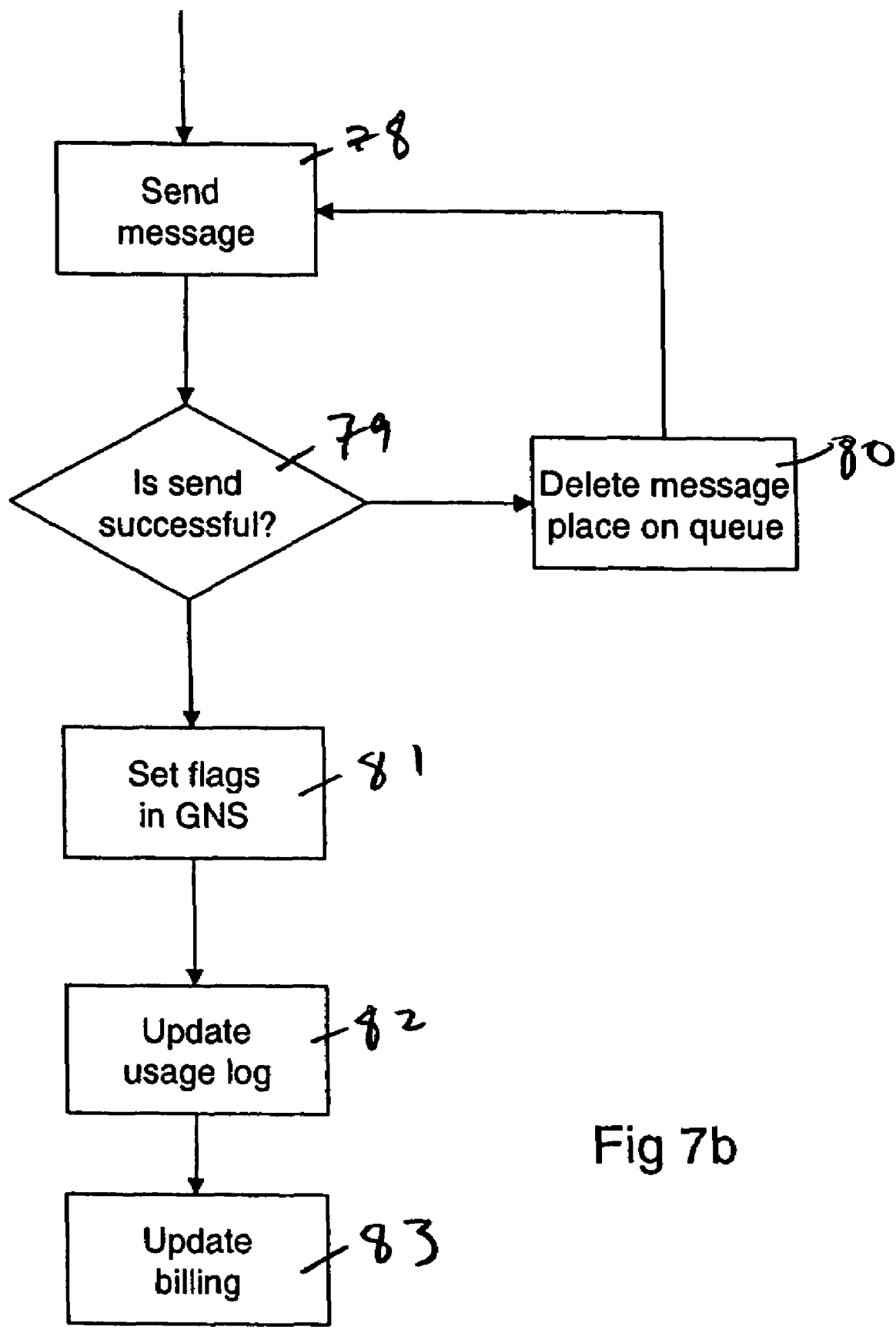

Once one or more groups have been set up the members may then request services to communicate with other members. One option is for the subscriber to use a text message group service to send group or "broadcast" messages to one or more group members of a chosen group, as shown in FIGS. 7a and 7b. Any member (e.g. "COACH") may wish to communicate with the entire group, e.g. to inform the team of a new venue for next week's game. Referring to FIG. 7, the member requests a text service by preparing 70 a text message in the usual way, entering text content (e.g. "game next Thursday, 7 pm @ home") and then sending 71 it to the group number, either by keying it in, or selecting it from a contacts directory in the terminal where the group number had been previously stored. Upon sending the message, the MAR 9 routes 72 the message to the destination of the text message interface 13 to the text message handler 28 in the server 11. The handler 28 then invokes 73 the user group manager 27 to query the group number store 23. The manager 27 uses the group number to find all the subscribers associated with the group from the appropriate record 32a. First, the manager 27 accesses the user authorisation handler 24 to determine that the sender is actually a member of the group by checking 74 that the sender's individual subscriber number is listed in the group member details. If not, then permission to send the message to the group is denied 75, the message is blocked and the action fails. An alert optionally may be sent to the sender to advise them of the failure.

If the sender is part of the group and is permitted to broadcast to the group, then the user group manager processes 76 the record, and extracts required member details for group members including each of their individual subscriber numbers. During processing, the user group manager does not include the sender's details, as they will not want to receive the message, nor those of any member who is blocked or otherwise indicated as not currently active. Once this is done, the text message is stored 77 in the message store 22, and the text handler 28 generates individual text messages to all active group members using their respective individual subscriber numbers taken from the store. Each generated message will include the group member as the originating CLI, to replace that of the sender in the received message. The text content of the message as received is included in each outgoing text message, and the username of the group member who sent the message is added to the text content of the message. If all of the text messages are not successfully sent 79, the message is deleted 80 from the store 22 and placed on a queue. The text handler 28 waits a predetermined time and then tries again 78.

If at least one subscriber receives the message, then the message remains in the store 81, and flags are set in the store by the user group manager 27 to indicate which subscribers successfully received the message. An alert is then optionally sent back to the sender to confirm successful delivery. The text handler 28 also communicates 82 with the usage logger to indicate that a message was sent and how many subscribers it was sent to. The usage logger 21 stores 82 this information, which a billing event processor 26 accesses 83 to generate billing information for passing to the service provider. The manner in which tariffs are structured will be dependent on the service provider, although one way would be to charge the sender according to the number of receivers of the message. For example, a first tariff may apply where there are up to five receivers and second tariff for 6 to 10 receivers and so on.

Members can reply to a group message sent according to the above procedure in a similar manner. Each group member can reply to the whole group by simply replying in the usual way for text messaging. As the originating CLI for the group message is the group number, and not the actual sender's dialing number, any reply will be handled according to the procedure set out above and FIG. 7a, 7b, that is, as a group service message. All active members of the group will also receive the reply, other than the member sending the reply.

Multimedia Messaging Functionality

The administration and broadcast functions may be conducted in an analogous manner using multimedia messaging as for text messages. As the process is effectively the same, it need no be described again here. Multimedia messaging does provide additional functionality to text messaging, however. For instance, through multimedia messaging, group multimedia messages may be sent, such as video clips, photographs, sound, graphics and the like. When a multimedia message is sent, and one or more of the group members have telephone handsets that do not support multimedia, an alternative procedure is undertaken for those that receive the message. When the group manager 27 queries 73 the group number store 23 to obtain details of subscribers in the group, it also determines from the information which of the subscribers have multimedia enabled terminals. The record 32a may have a flag field for this purpose. For those that do, the process as per FIG. 7a, 7b is undertaken. For the non-supported terminals, a standard message is generated by the user group manager 27 containing a link to a website where the message can be viewed.

Voice Platform Functionality

Figure 8:
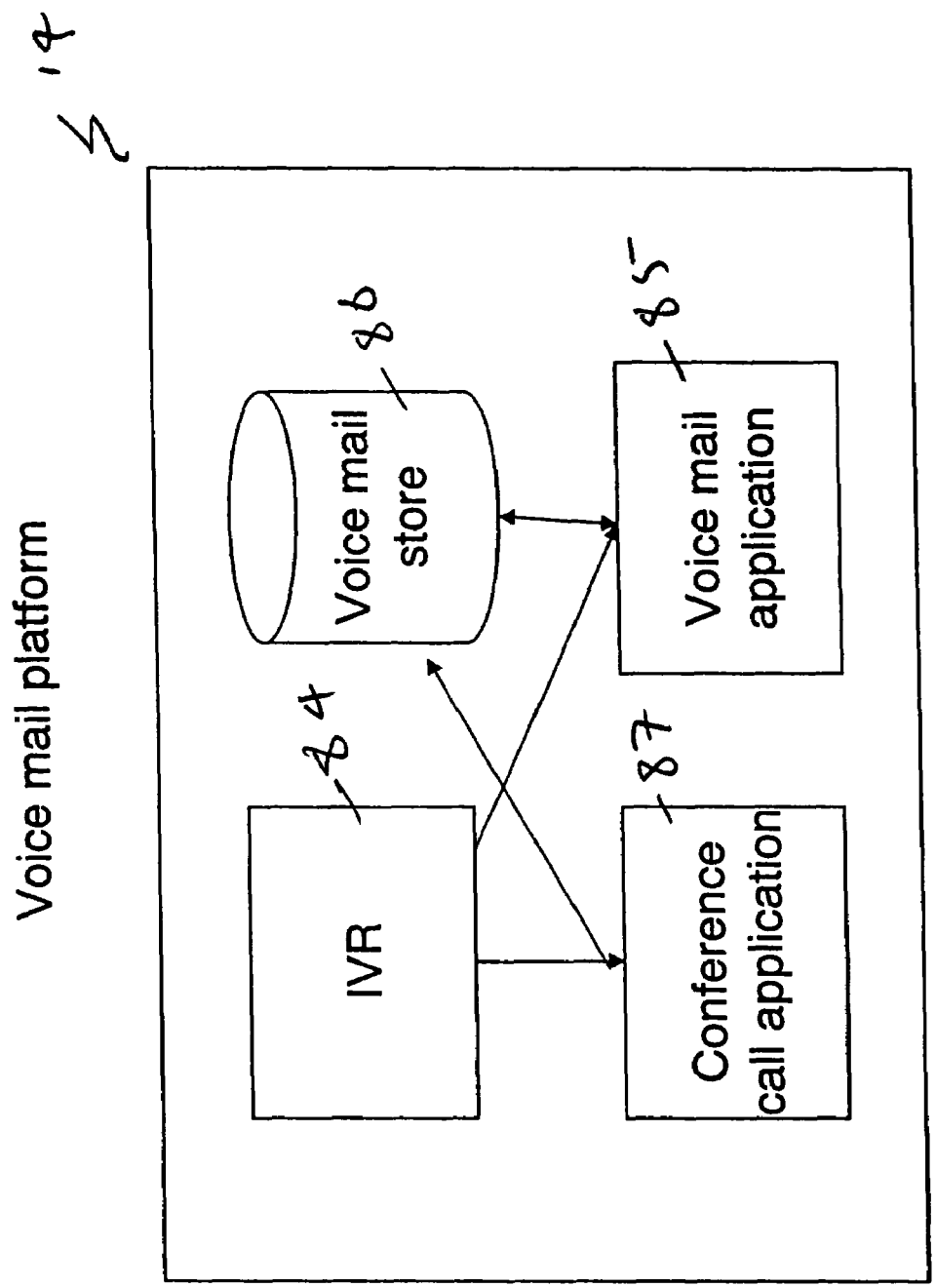
FIG. 8 shows a block diagram of the voice mail platform.

A group member can leave a group voice message for other group members or participate in a conference call with other group members by utilizing the group number. FIG. 8 shows further details of the voice platform 14, which includes an interactive voice response (IVR) system 84, a voice mail application 85, a voice mail store 86, and a conference call application 87.

Figure 9:
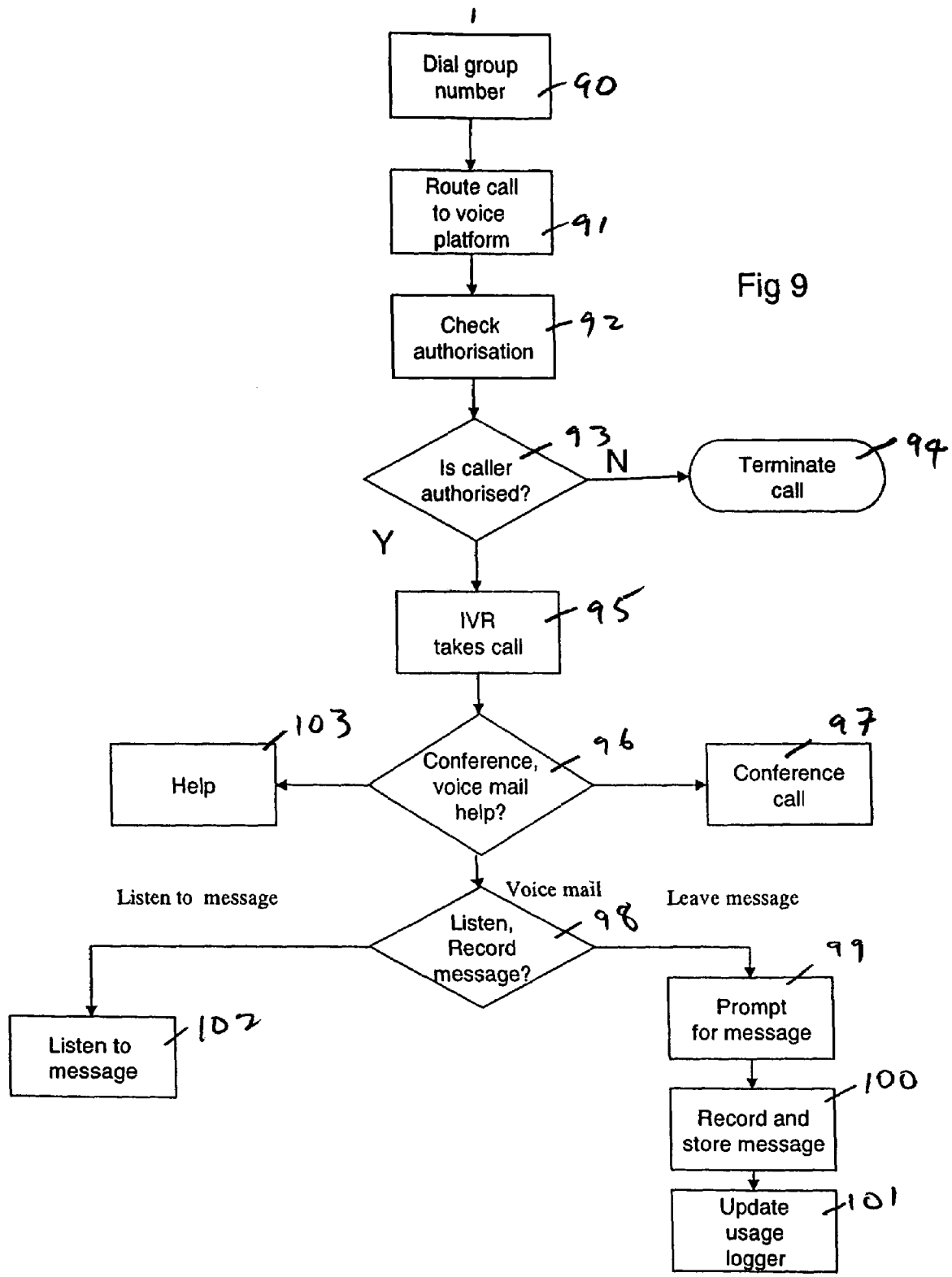
FIG. 9 shows a flow diagram of voice platform functionality.

Referring to FIG. 9, a subscriber makes a request to participate in a conference by dialing 90 the group number of interest in the usual manner for a voice call. The network 16 is set up to recognize, by Intelligent Network (IN) processing, the number dialled as a group number, and routes 91 the call through to a destination of the voice module 14 of the apparatus 10. The module 14 answers the call, and passes 92 the CLI of the caller and the dialled group number to the user authorisation module 24 in the server 11. The user authorisation module 24 queries 92 the group number store 23 to make sure that the caller is part of the group relating to the group number he has dialled, and as such has authorisation to participate in communications with that group. If he does not belong 93 to the group 83, then the call is terminated 94, optionally with a recorded message indicating why.

The caller can interact with the IVR 84 by pressing a key on their telephone handset to generate an appropriate tone, and/ or by voice entry. If the caller is authorised, the call is passed 95 to the IVR 84 which provides the caller with a set of options in the form of a voice prompt, the options including conference calling, voice mail options, and help. If the caller requests conference calling 96, he is patched through to a conference call 97 with the other group members by the conference application. The caller can then speak with any other group members who have called in a similar manner and are currently patched into the call. Members can use any suitable method for arranging a time for dialing in to participate with the conference call, such as using a group text message previously described with reference to FIGS. 7a, 7b. Once a conference caller hangs up, the conference call application communicates with the usage logger in the server to record the call. The usage logger 21 communicates with the billing processor to generate the appropriate billing information that the service provider uses to bill the subscriber for the call. The audio of the conference call is recorded and stored in the message store 22 for later listening by a group member, if desired.

Alternatively, the caller may wish to leave a voice mail for all the members of the group, or check messages that have been left for the BCC group. The user dials 90 the group number and is routed 91 through to the voice platform 14 which answers the call and authorises him 92 as described above. Once authorisation is complete, the caller is connected 95 through to the IVR 84 which provides the set of available options. In this case, the user requests voice mail 98, at which point the voice mail application 85 takes over. It provides 98 various options to the user, including listening to group messages already recorded by group members and recording a new message for other group members to listen to. If the user requests to record a new message, the voice mail application prompts 99 the user for a message, records it and stores 100 it in the message store, tagged with the username. An alert can be sent to group members to advise them that there is a new message. The recorded message is also stored in the message store 22 in the server 11. The usage logger 21 is updated 101. Similarly, a group member can retrieve the message by dialing the group number, and following the IVR menus. The voice mail application then plays 102 the message over the phone to the group member who has dialled in. Once a message has been listened to by a group member, a flag is set in both the voice mail store 86 and the message store 22 to indicate it has been read by that group member.

The voice mail application 85 also provides the usual functionality associated with voice mail messaging, such as replaying, deleting, saving and the like. An administrator has authority to delete messages entirely, while individual members can delete and save messages for themselves. The voice mail application 85 toggles flags to indicate which members have saved or deleted messages. Flags for such functionality can be set for each group member, as necessary. Therefore while the messages will always exist, to certain members they will have the appearance of being deleted or saved, in accordance with settings relating to their own usage. Help to use the voice platform can also be provided 103, by requesting 96 the correct option when it is provided by the IVR 84.

Web Server Functionality

Subscribers can access to the apparatus 10 via a computer terminal 19 communicating with the web server 15 using the internet 16b. This provides a subscriber with a range of options, including viewing logs, conducting administration tasks, and communicating via bulletin boards, multimedia, and text messages. The function and construction of a web server will be known to those skilled in the art and therefore will not be described here.

Figure 10:
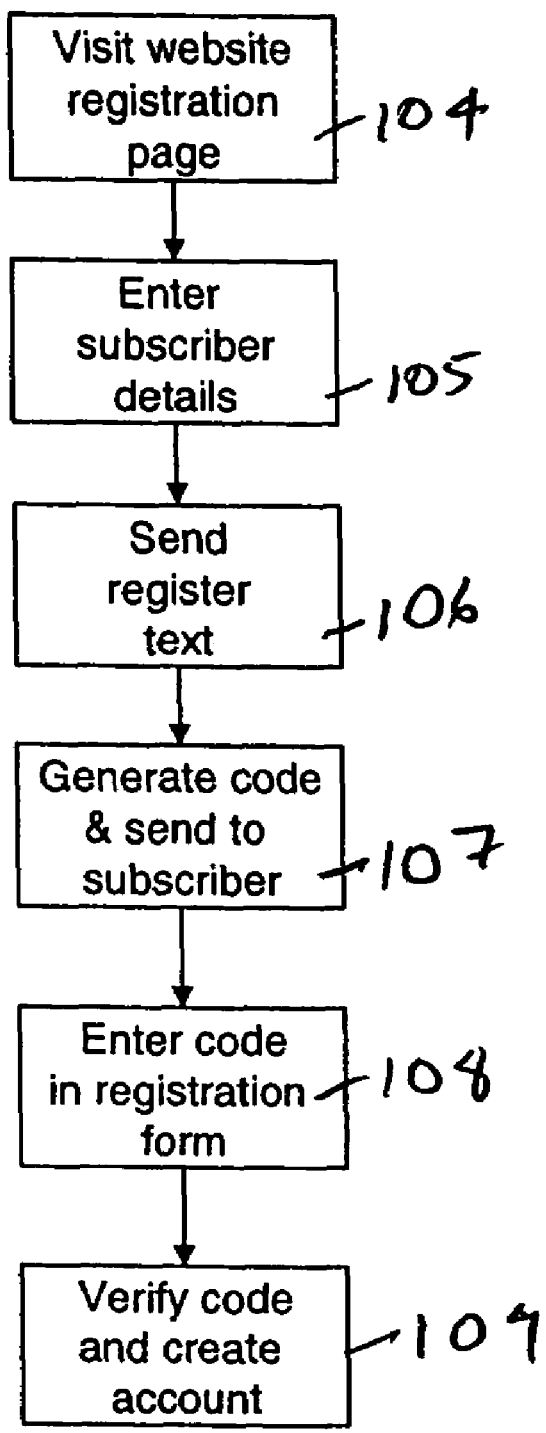
FIG. 10 shows a flow diagram of a web registration procedure.

Prior to utilizing any of the facilities provided by the web server 15, the system may require a subscriber to register themselves. As shown in FIG. 10, to do so, the subscriber uses a browser to go to 91 the website associated with the service provided by the apparatus 10. The website initially provides a log in page. If the user does not already have an account, they select the link to set up one. A registration form appears 104 in which the subscriber enters 105 their details including their mobile telephone dialing number and password. The subscriber is then directed to a web page that instructs 106 the subscriber to send a "REGISTER" command in the content of a text or multimedia message to the service number of the apparatus 10. On doing so, the message is routed to the apparatus 10, via the text handler 28 to the administration module 25. The module generates 107 a registration code that it sends back to the subscriber. The subscriber is instructed to enter 108 the registration code into a field on a form in the website. The registration code can be generated in any suitable way, and is communicated between the administration module 25 and web server 15 in a suitable manner, so that both know the correct code. Upon receiving and verifying 109 the registration code, the web server 15 sets up an account for the user. This procedure provides the web server with knowledge of the subscriber's telephone dialing number so that it can perform group functions. The procedure also validates the subscriber's web account against the individual subscriber number, to ensure that people cannot set up an account with another subscriber's telephone dialing number. Each time a subscriber wishes to use a web service, they log in and are provided with access to services and information pertaining to the groups to which they belong.

Figure 11:
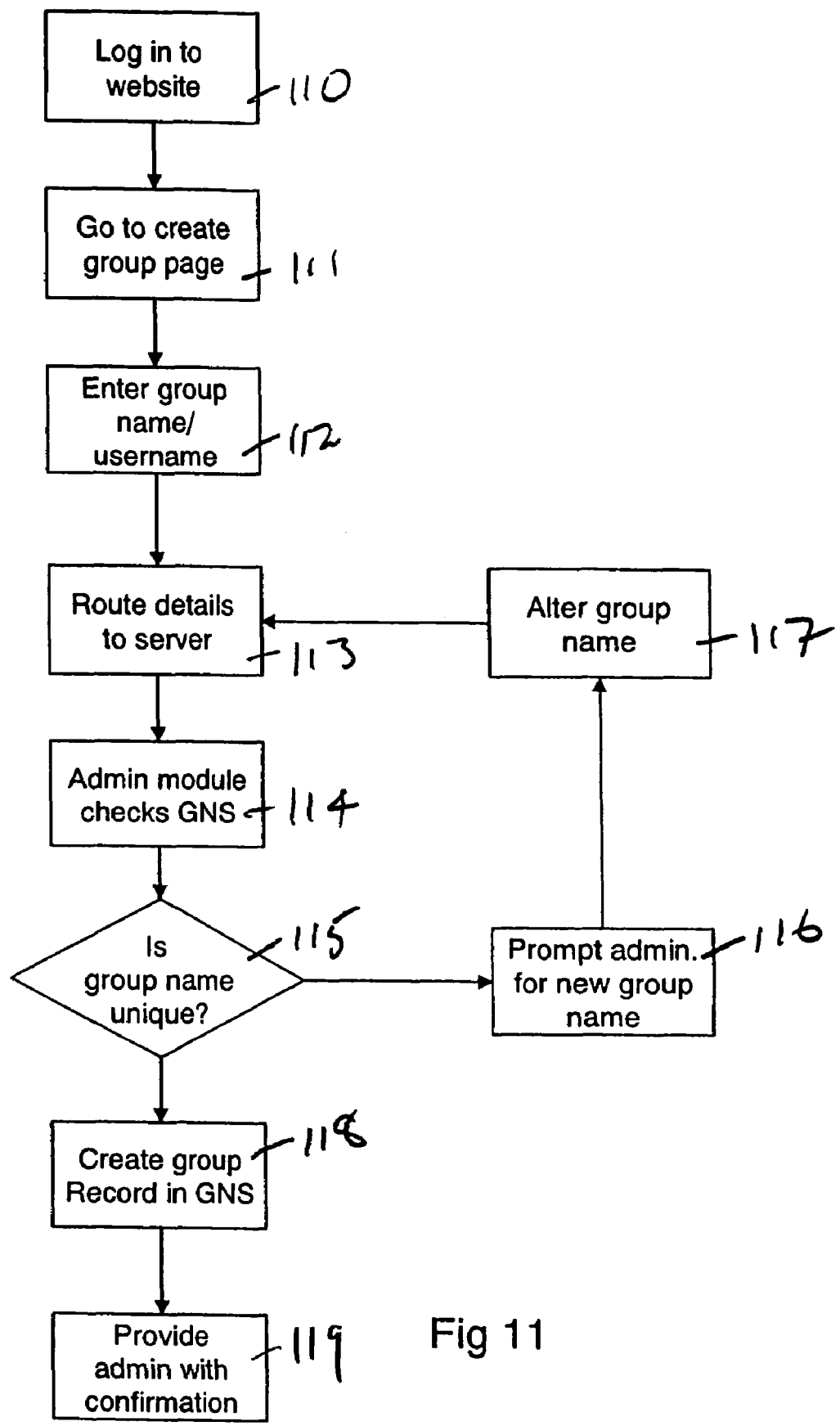
FIG. 11 shows a flow diagram of another group creation procedure using a website.

Creating a user group can be conducted using the web server 15 interface as well as by text messaging as described earlier. Referring to FIG. 11, after logging in 110, the subscriber 111 is presented with a web form in which they can enter 112 the proposed name of the group (e.g. Burton Cricket Club) along with the administrator's chosen username for the group (e.g. COACH). The web server 15 processes the form, and passes 113 the relevant information, including the proposed group name and the subscriber's mobile dialing number to the administration module 25. From here the procedure is similar as for group creation using a text interface. The administration module 25 checks 114 in the group number store 23 that the proposed name is available, and if not, advises the user via the website 116. The user must then choose 117 another name.

If, the group name has not previously been registered 115, then the administration module 25 then finds the next available group number and creates 118 a new record in the group number store 23 to associate the group name with the group number. At the initial stage, the record includes the group name, the next available group number, and the details of the administrator, including their individual subscriber number. The number is then activated within the network 16a, 16b. The administration module 25 reports back to the web server 15, and a web page is displayed that confirms 119 that group set up has been successful, provides the group number and any other information to assist the administrator to use the service.

Figure 12:
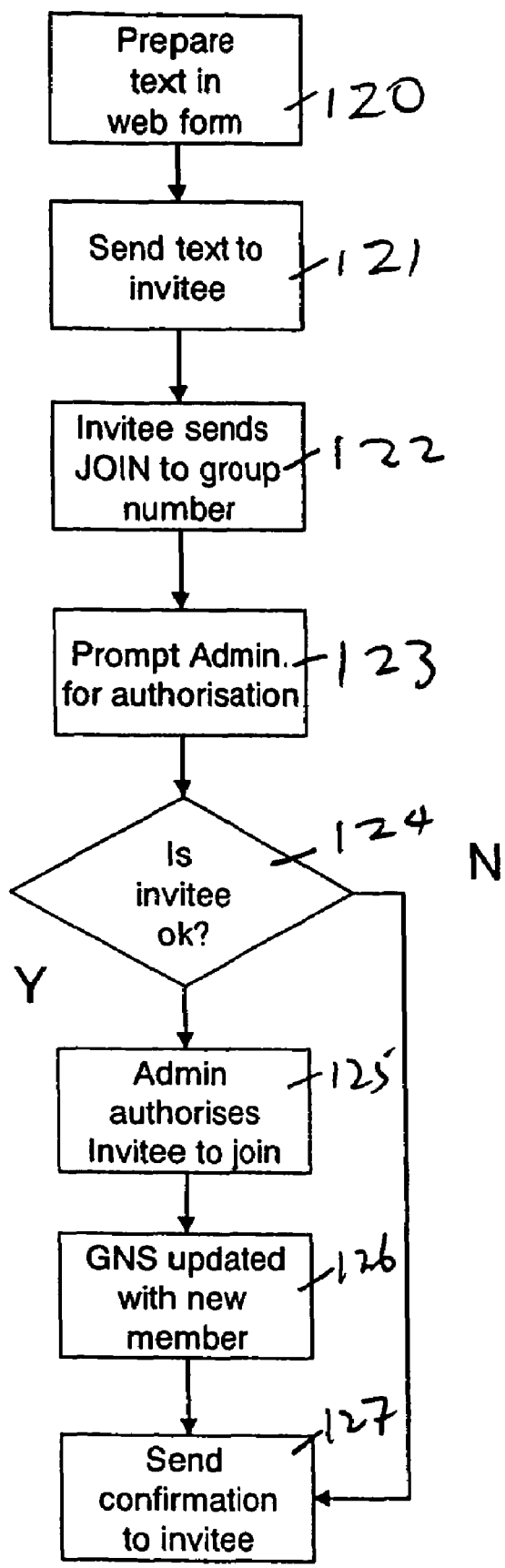
FIG. 12 shows a flow diagram of another invite procedure using a website.

Once set up, invites can be sent to invite other subscribers to join the group in a variety of ways, as mentioned previously. As shown in FIG. 12 one additional way is initiate the sending of text messages from a computer via the web server 15. The user enters 120 text in a web form presented by the web sever 15. The text includes an invite message and instructions to reply with the command "JOIN" along with their chosen username to the group telephone dialing number. The text is then sent 121 to the invitee. It is possible to send several invite messages simultaneously by entering the details of all invitees in the appropriate field in the web form.

Upon reading the message, the invitee can do nothing, in which case they are not registered with the group, or alternatively send 122 the command "JOIN" and their desired username (e.g. "SAMMY") in a text message to the group number. The message is routed to the administration module 25 in the server, which then generates an alert message which is sent back to the web server 15. The web server presents 123 a web page that indicates to the administrator that the invitee wants to join the groups and will also indicate his phone dialing number, and provides the administrator with the option to accept or decline the member. If the administrator does not want to accept the invitee, he declines, and the invitee is not registered with the group. Alternatively, he accepts 125. The web server 15 communicates with the administration mode 25, which updates 126 the record in the group number store 23 to indicate that the invitee is now a member by including his details in the group record. The new member is then alerted 127, via the alert engine 29 that he is a member of the group, and is informed of any necessary information regarding membership. The administrator may also be sent confirmation via a web page. In an alternative, sending the text invite will be considered as authorization, and no acceptance of the return text is required by the inviter, that is, the invitee will automatically be registered on send a "JOIN" text.

Figure 13:
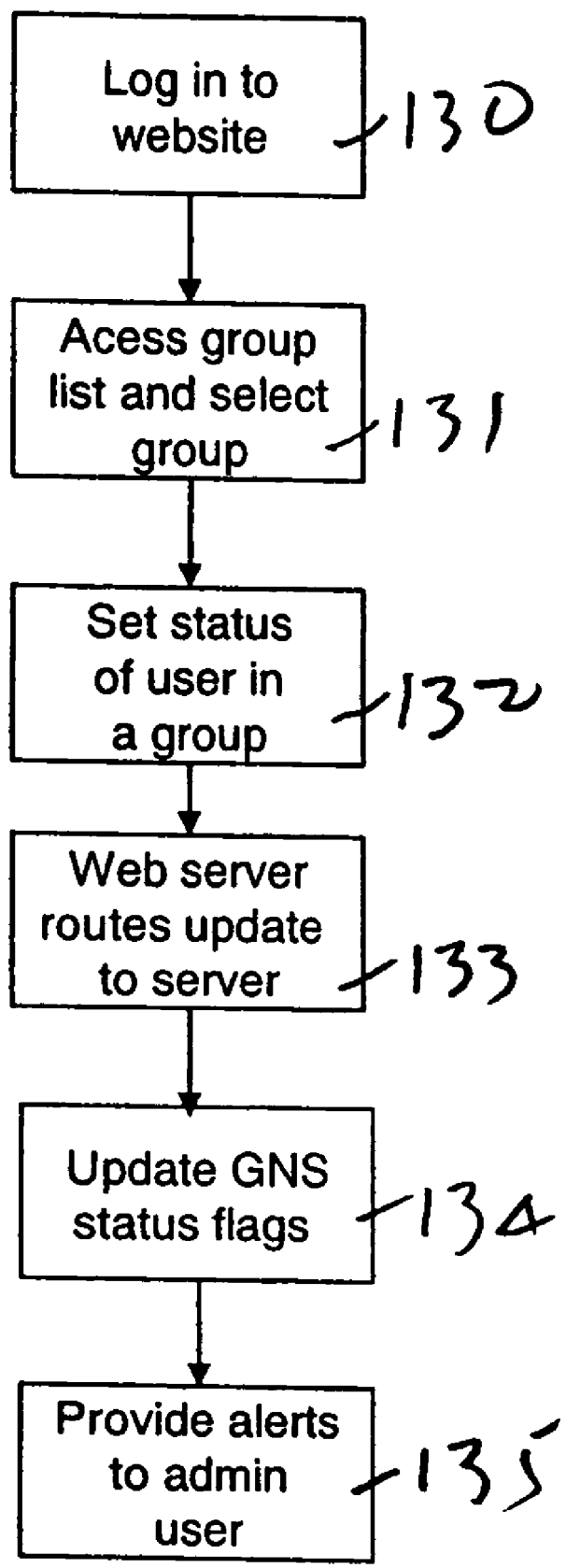
FIG. 13 shows a flow diagram of a status update procedure using a website.

Once a subscriber is logged in to the web site, they have access to group administration and settings functions relating to any of the groups they are members of in accordance with their permissions. When a user is an administrator of a group, they have permissions to alter group and subscriber settings for all members in the group. When a user is only a normal member of a group, the only have permission to alter member settings in that group in relation to themselves. If a subscriber is a member of several groups, details of each will be displayed by the website after the log in procedure. The user can then alter the settings for each, as required, in accordance with their permissions for each group. As mentioned previously, one type of subscriber setting is status 37, which may be specified and stored in the group number store 23. Referring to FIG. 13, the subscriber can do this by logging on to 130 the website and accessing a page that displays the groups with which the subscriber is a member. They can select 131 the group of interest, and view group members details and statuses. Where a subscriber is an administrator of a group, they may be able to view information that is kept secret from normal members. They will also have permissions to alter all statuses, whereas if a subscriber is only a member, they can only alter their own. Individual member's settings flags 37 can be specified by the administrator or member by toggling 132 the appropriate flags. The web server 15 passes 133 the relevant information to the administration module 25, which will then update 134 a flag 37 in the group store 23 to show them member is blocked, for example as shown in FIG. 3. It may also send 135 alerts to the user and/or administrator confirming the action taken by text. An administrator may follow a similar procedure for removing someone entirely from the group, or a member may remove themselves. Other different maintenance procedures may also be implemented in the system, where desirable. For example, changing usernames, group names and administrators can take place by subscribers with the appropriate permissions.

Figure 14:
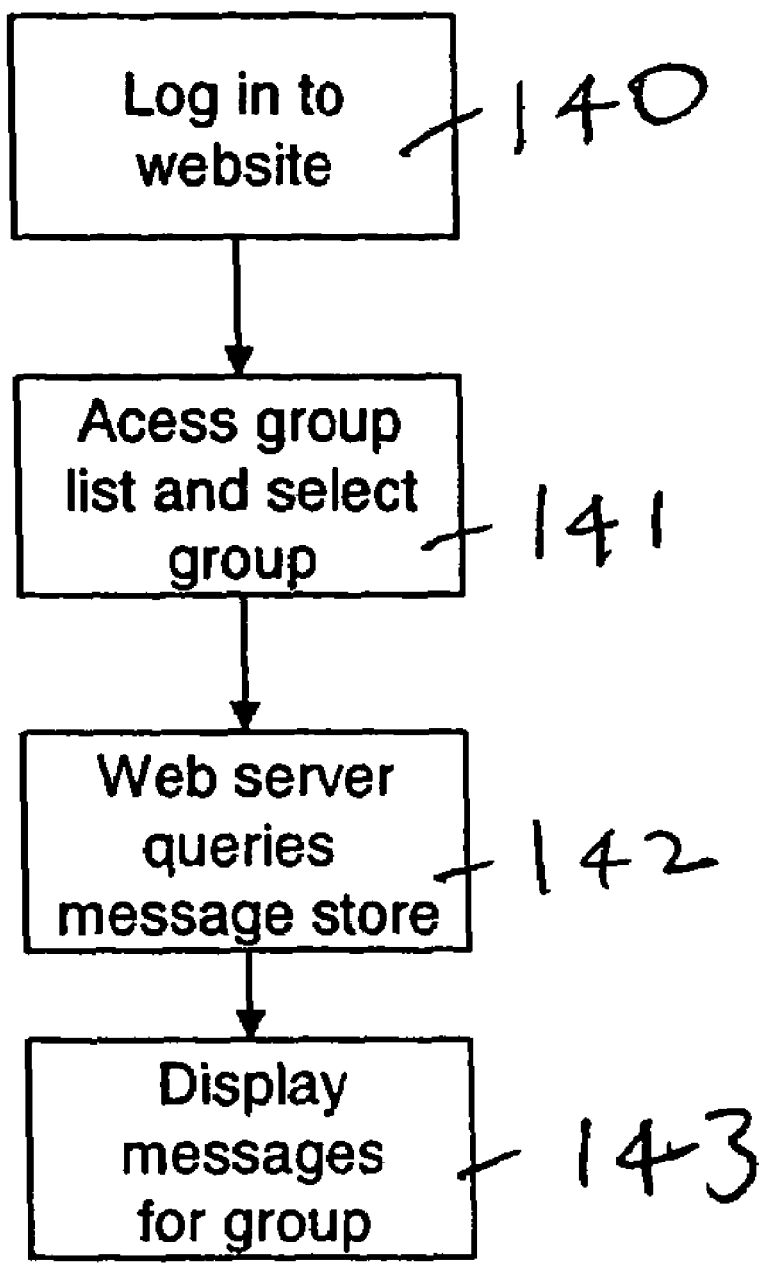
FIG. 14 shows a flow diagram of a message inspection procedure using a website.

Referring to FIG. 14, once logged in 140, the subscriber may select 141 one of their groups and inspect a log of all communications that have occurred in relation to that group. The log may include text, multimedia voice mail, and conference call usages. To provide this information, the web server 15 queries 142 the message store 22, and extracts log information for the selected group. The server 15 then presents 143 the information in a suitable format to the user via a web page. An administrator has the option to delete messages entirely, if desired.

Figure 15A:
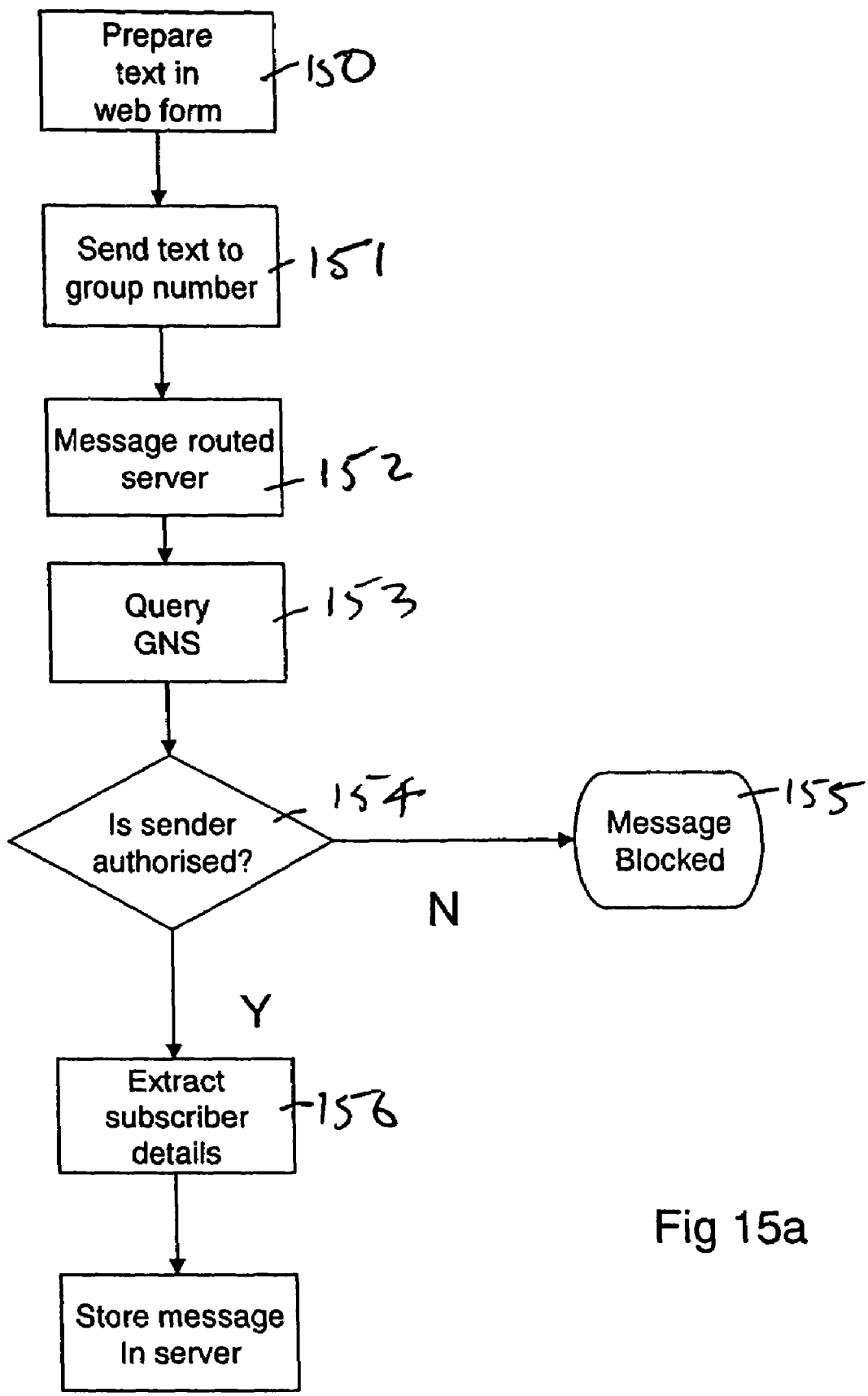
FIGS. 15a and 15b show flow diagrams of a text broadcast procedure using a website.
Figure 15B:
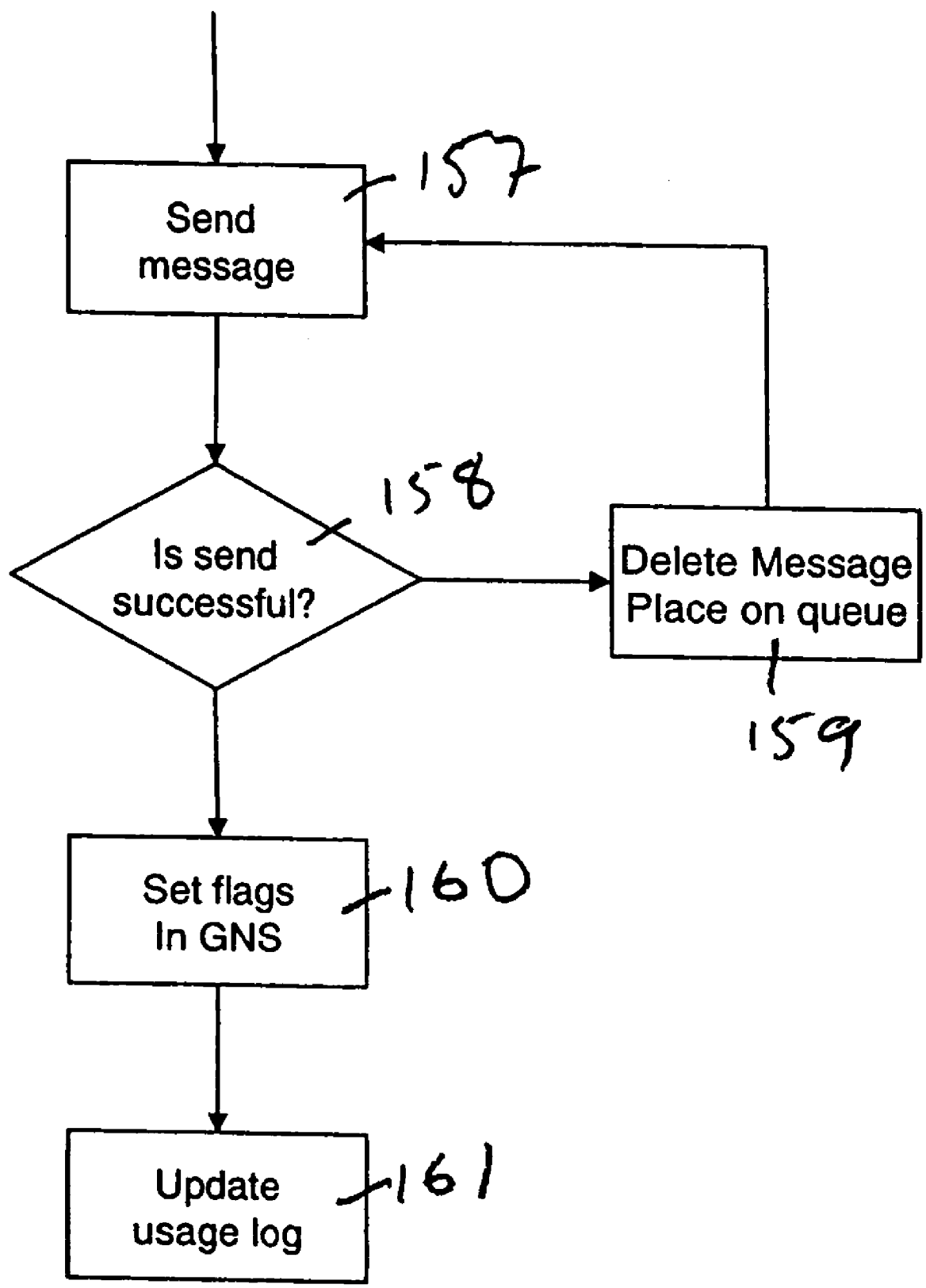

A subscriber can utilize the groups to invoke a range of group services. For example, a "broadcast" message can be sent to all users in a particular group. Referring to FIGS. 15a, 15b a text message can be sent in a manner similar to that described earlier, but invoked using the web server. After logging in, the user can choose to send a text message and is presented with a form in which the message can be entered 150. The group can be selected from a list of groups in a "phone book" or similar that the subscriber is a member of and for which the group telephone dialing numbers have been stored with the respective group names. Upon submitting the form 151, the web server 15 adds the username of the sender to the entered text and passes 152 the generated text message to the text message interface 13.

The text message interface 13 routes the message to the text message handler 28 in the server 11. The group text is then sent out 157 to group members in the same manner as that described for group text messages as described with reference to FIGS. 7a and 7b, each message being addressed with the group number as the originating CLI. Group replying is thus also enabled as described earlier. The apparatus 10 may send confirmation to the web server 15 that the message was successfully sent. A multimedia message can also be sent in a similar manner, as described earlier. The subscriber will submit details in a web page form, along with any multimedia attachments to be sent.

Web posting can also be provided, whereby a subscriber fills in a form to post news or information to a bulletin board or similar to the group of interest. The form will include a field for entering the group number or name. The message will be stored in the web server for later retrieval by other group members who log in to the website.

OTHER EMBODIMENTS

The above embodiments are to be understood as illustrative examples of the invention. The invention could be implemented in a variety of ways and further embodiments of the invention are envisaged that provide the ability for subscribers to request group services in a telecommunications network by using just one telephone dialing number. For example, any activities carried out by text messaging could be adapted for carrying out multimedia messaging. Administration functions, such as group set up, status setting, blocking and the like, may optionally be carried out by voice using the voice module and appropriate IVR capability. Additional functionality could be provided to enable text or multimedia "chat rooms" for each group, whereby messages would be posted in realtime to the group for inspection and reply, analogous to conference calling. Group emailing could also be implemented using the web server. It will also be appreciated by those skilled in the art that the invention can be adapted for providing group services relating to other modes of telecommunication, and not just those disclosed here.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for providing group services to subscribers in a telecommunications network, including:

receiving a first service request sent by a first originating party of a predefined group in a first communications mode, said first service request including a first telephone dialing number;

routing said first service request to a first destination selected on the basis of said first telephone dialing number and the first communications mode;

in response to receipt of said first service request at said first destination, confirming that the first originating party is a member of the predefined group, and selecting a first group of participants from the predefined group on the basis of said first telephone dialing number;

in response to confirmation that the first originating party is a member of the predefined group and selection of the first group, providing via the first destination a first group service to the selected first group of participants, the first group service having associated therewith the first telephone dialing number as originating calling line identity to facilitate a group reply to the first group of participants by any member of the first group of participants;

receiving a second service request sent by a second originating party of the predefined group in a second communications mode, which second communications mode is different from said first communications mode, said second service request including the first telephone dialing number;

routing said second service request to a second destination selected on the basis of said first telephone dialing number and the second communications mode, second destination being different from the first destination;

in response to receipt of said second service request at said second destination, confirming that the second originating party is a member of the predefined group and selecting a second group of participants from the predefined group on the basis of said first telephone dialing number; and in response to confirmation that the second originating party is a member of the predefined group and selection of the second group, providing via the second destination a second group service to the selected second group of participants, the second group service having associated therewith the first telephone dialing number as originating calling line identity to facilitate a group reply to the second group of participants by any member of the second group of participants.

2. A method according to claim 1, wherein said method including:
storing group member data, said group member data identifying groups of participants;
storing telephone dialing number data, said telephone dialing number data identifying group telephone dialing numbers; and
storing relationship data relating said group member data to said group telephone dialing number data.

3. A method according to claim 2, wherein said relationship data identifies a one-to-one relationship between said first group of participants and said first telephone dialing number.

4. A method according to claim 1, wherein both said first and second service requests are received from the same originating party.

5. A method according to claim 1, wherein said first and second groups include a common set of participants.

6. A method according to claim 1, wherein one of said first and second communications mode is a store-and-forward messaging communications mode, and wherein provision of the service includes transmitting a store-and-forward message to members of the selected group of participants.

7. A method according to claim 1, wherein one of said first and second communications mode is a group voice mail communications mode, and wherein provision of the service includes providing the selected group of participants with access to a group voice message.

8. A method according to claim 1, wherein one of said first and second communications mode is a conference call communications mode, and wherein provision of the service includes providing participants of the selected group with access to a conference call.

9. A method according to claim 1, including storing a record of communications made using the services, and making said record selectively available to the selected group of participants.

10. A method according to claim 1, wherein the step of providing said first and/or second group service includes transmitting data, identifying said first telephone dialing number as a calling line identity, to members of the selected groups of participants during the provision of the service.

11. A method according to claim 10, comprising at least one of said selected participants transmitting a service request in reply, said reply service request including the first telephone dialing number, said reply service request deriving the first telephone dialing number from said calling line identity.

12. A method according to claim 1, comprising:
receiving an administration request, said administration request including said first telephone dialing number;
routing said administration request to a destination selected on the basis of said first telephone dialing number and a group administration command; and
in response to receipt of said administration request, selecting group member data relating to said first group of participants and updating said selected group member data.

13. A method according to claim 1, including configuring a group service in dependence on a calling line identity received in the service request.

14. Service apparatus for providing a group service to subscribers in a telecommunications network, said service apparatus being arranged to carry out the method of claim 1.

15. A method for providing a group service to subscribers in a telecommunications network, including:
storing data indicating a set of telephone dialing numbers which are intended to be allocated for use in the provision of group services;
conducting a group set up procedure for defining a service group for a defined group of members, said set up procedure including:
a) receiving a group set up request;
b) allocating a first telephone dialing number from said set of numbers to said group;
c) storing group member data identifying members of said defined group to render the group member data accessible by a number of different group service modules;
d) identifying said first telephone dialing number to one or more of said plurality of members of said defined group;
e) receiving a first service request sent by a first originating party of the defined group in a first communications mode, said first service request including said first telephone dialing number, and in response thereto, confirming that the first originating party is a member of the defined group;
f) routing to a first destination the first service request, the first destination comprising a first group service module of the number of different group service modules, the routing to the first destination being on the basis of the first communications mode, and at the first group service module of the number of different group service modules, identifying said group member data from said first telephone dialing number received in said first service request;
g) at said first group service module, providing via the first destination a first group service in response to identifying said group member data from said first telephone dialing number received in said first service request, the first group service having associated therewith the first telephone dialing number as originating calling line identity to facilitate a group reply by a member identified in the group member data;
h) receiving a second service request sent by a second originating party of the defined group in a second communications mode, which second communications mode is different from said first communications mode, said second service request including said first telephone dialing number, and in response thereto, confirming that the second originating party is a member of the defined group;
i) routing to a second destination the second service request, the second destination comprising a second group service module of the number of different group service modules and being different from the first destination, the routine to the second destination being on the basis of the second communications mode, and at the second group service module, which second group service module is different to said first said group service module of the number of different group service modules, identifying said group member data from said first telephone dialing number received in said second service request; and j) at said second group service module, providing via the second destination a second group service in response to identifying said group member data from said first telephone dialing number received in said second service request, the second group service having associated therewith the first telephone dialing number as originating calling line identity to facilitate a group reply by a member identified in the group member data.

16. A method according to claim 15, wherein step a) comprises receiving said group set up request via said telecommunications network.

17. A method according to claim 16, wherein said set up request is received in a store-and-forward type message.

18. A method according to claim 15, wherein step d) comprises transmitting said first telephone dialing number via said telecommunications network.

19. A method according to claim 18, wherein said first telephone dialing number is transmitted in a store-and-forward type message.

20. Service apparatus for providing a group service to subscribers in a telecommunications network, said service apparatus being arranged to carry out the method of claim 15.

* * * * *

UNITED STATES PATENT AND TRADEMARK OFFICE
CERTIFICATE OF CORRECTION

PATENT NO. : 7,706,817 B2 Page 1 of 1
APPLICATION NO. : 11/153216
DATED : April 27, 2010
INVENTOR(S) : Bamrah et al.

It is certified that error appears in the above-identified patent and that said Letters Patent is hereby corrected as shown below:

In Claim 1, at Column 17, Line 3: Delete "second communications mode, second"

and insert -- second communications mode, the second --

Signed and Sealed this

Twenty-ninth Day of June, 2010

David J. Kappos
*Director of the United States Patent and Trademark Office*